United States Patent [19]

Hull

[11] Patent Number: 4,499,759

[45] Date of Patent: Feb. 19, 1985

[54] ROAD SIMULATOR TESTING AUTOMOTIVE AND TRUCK WHEELS AND HUBS

[75] Inventor: Frederick H. Hull, Ft. Washington, Pa.

[73] Assignee: The Budd Company, Troy, Mich.

[21] Appl. No.: 213,206

[22] Filed: Dec. 5, 1980

[51] Int. Cl.³ .................................................. G01M 17/02
[52] U.S. Cl. .................................................... 73/146
[58] Field of Search ......................... 73/146, 8, 129

[56] References Cited

U.S. PATENT DOCUMENTS

| | | | |
|---|---|---|---|
| 2,251,803 | 8/1941 | Pummill | 73/146 |
| 3,546,936 | 12/1970 | Tarpinian et al. | 73/146 |
| 3,937,076 | 2/1976 | Pommellet et al. | 73/146 |
| 4,160,378 | 7/1979 | Himmler | 73/146 |
| 4,238,954 | 12/1980 | Langer | 73/146 |
| 4,359,896 | 11/1982 | Brown et al. | 73/146 |

*Primary Examiner*—Donald O. Woodiel
*Attorney, Agent, or Firm*—Edward M. Farrell; Herman Foster; Thomas I. Davenport

[57] ABSTRACT

Methods and apparatus for testing automotive and truck wheels and hubs include placing a wheel connected to a hub and an arm or axle like member into a frame which maintains the wheel relatively fixed. Actuators are provided to apply forces to the wheel through the axle and hub. The forces are applied in different directions with the actuators being programmed to simulate actual road conditions over a long period of time in a relatively short test time without requiring substantial rotation of the wheel.

10 Claims, 3 Drawing Figures

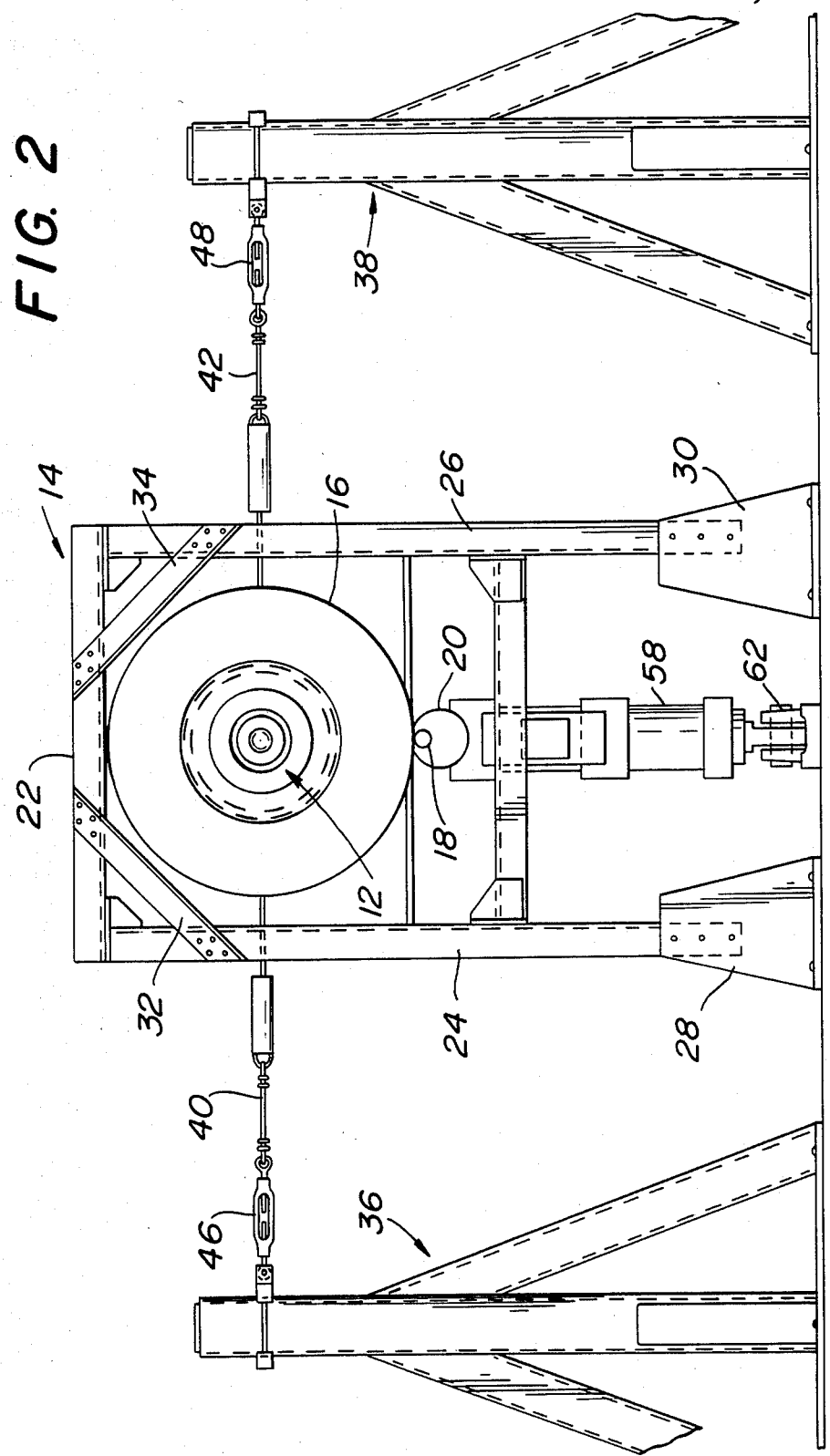

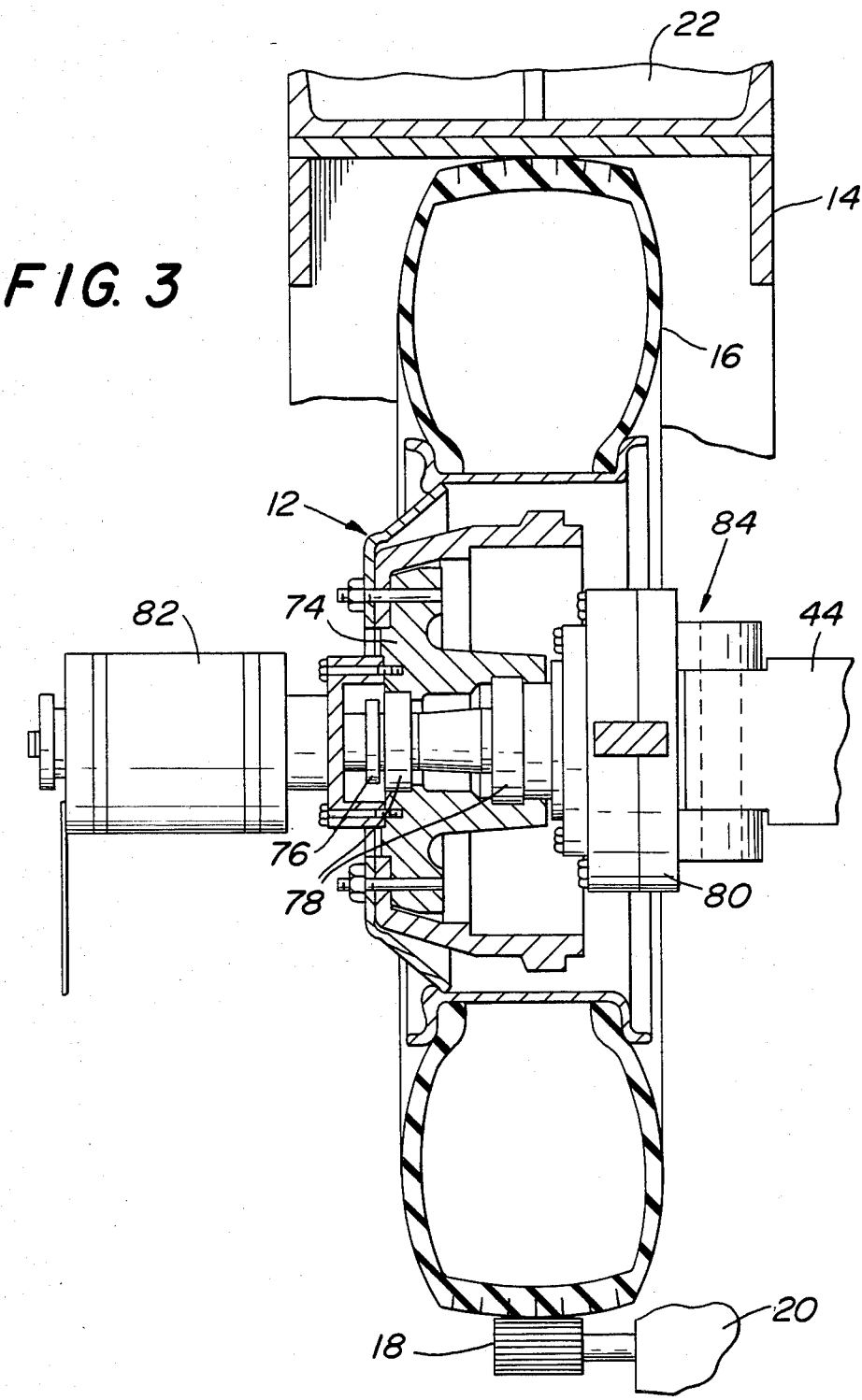

ROAD SIMULATOR TESTING AUTOMOTIVE AND TRUCK WHEELS AND HUBS

BACKGROUND OF THE INVENTION

Testing of wheels and hubs for automobiles and trucks is used extensively for both development purposes and for quality control. The methods of testing heretofore have often been slow, inefficient, costly and not always exactly correlate with the fatigue life of the wheel or a hub in the field.

The testing of a wheel or hub heretofore has generally required the wheel to be rotated a large number of time. The total life test of the wheel and hub is generally in the order of a quarter of a million cycles and normally would take several weeks or months to test under normal conditions. This problem can not be solved simply by speeding up the process, such as rotating the wheel faster, because it was found that there are practical limits due to tire wear, bearing wear, excessive heat, excessive horse power required, and other things which limit the speed at which the wheel can be rotated. Also, increasing the speed of the wheel to the maximum rate possible would require a machine of gigantic proportions both in size, weight, horsepower and the like.

Heretofore, in testing the wheels and hubs, it was believed that the rotation of the wheel contributed to a major part of the stresses produced in the wheel during testing. In developing the present invention, however, it was discovered that the rotation or cyclic part of the test was not a large contributor to the total strain levels on the wheel as the wheel rotated over rough surfaces. It was discovered that the random type input, such as resulting from holes and bumps in the road, turned out to be a much larger contributor than the steady state load which heretofore was associated with the rotation of the wheel.

OBJECTS OF THE INVENTION

It is an object of this invention to provide a novel road simulator for testing automotive and truck wheels and hubs.

It is a further object of this invention to provide means for testing automotive and truck wheels and hubs in a minimum amount of time.

It is still a further object of this invention to provide improved methods and means for simulating a road test for wheels and hubs in which time required for testing and the equipment required for testing is minimized.

BRIEF SUMMARY OF THE INVENTION

In accordance with the present invention, a wheel is connected to a hub and an arm like arm member and placed in a fixed frame which maintains the wheel relatively fixed. Actuators are provided to apply lateral and vertical forces and moments to the wheel to simulate actual road conditions. The actuators are programmed to create the forces actually encountered during road conditions over a long period of time. Because it is not necessary to rotate the wheel during the testing, it is possible to provide testing of the wheel and hub in a relatively short time.

Other objects and advantages of the present invention will be apparent and suggest themselves to those skilled in the art, from a reading of the following specification and claims taken in conjunction with the accompanying drawings:

BRIEF DESCRIPTION OF THE DRAWINGS

FIG. 2 is an end view of the wheel in test apparatus, in accordance with the present invention; and FIG. 3 is an enlarged view, partly in cross-section illustrating a wheel and associated parts fixed into a frame, in accordance with the present invention.

DESCRIPTION OF THE INVENTION

Figure 1:
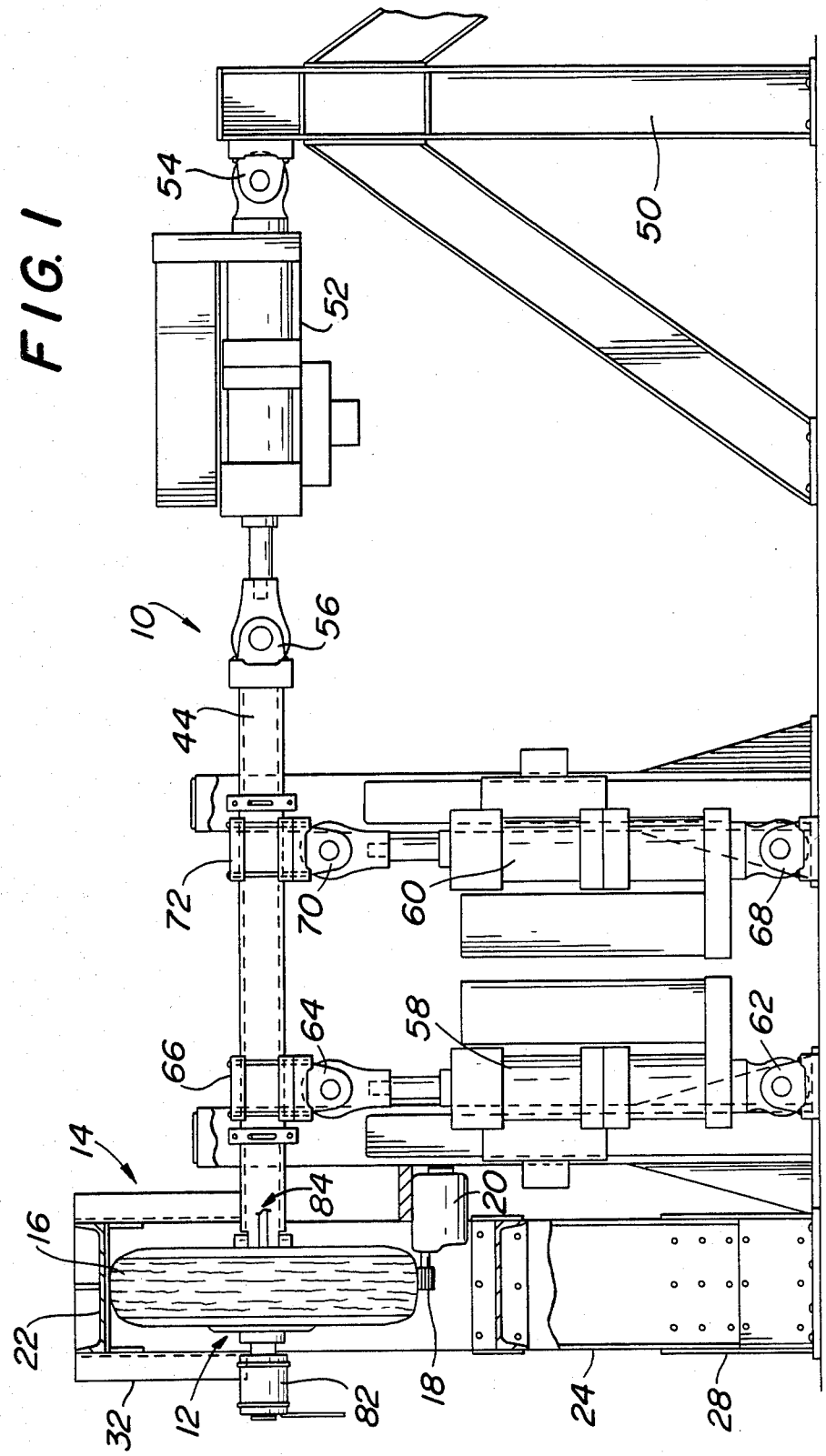
FIG. 1 is a side view illustrating a wheel being tested by test apparatus, in accordance with the present invention.

Referring particularly to FIGS. 1 and 2, road simulator testing apparatus 10 is connected to a wheel 12 under test. The wheel 12 is fixed into position in a frame 14. As will be seen in detail in connection with FIG. 3, the wheel 12 includes a number of items including a tire 16 which presses against the upper frame 14.

The bottom of the tire 16 is pressed by a rotatable element 18 which is driven by a motor 20. While the present invention is directed toward the concept of not having to rotate the wheel 12 a large number of times, nevertheless, it is rotated very slowly by the rotator 18 so that the entire wheel is tested in different positions and also to prevent excessive wear in the tire and bearings at a particular point.

As illustrated in FIG. 2, the frame 14 comprises a stand having a top beam 22 and two vertical beams 24 and 26 which are secured to base members 28 and 30 which are secured to the ground by any suitable means. Diagonal members 32 and 34 are connected between the vertical beams 24 and 26, respectively, and the top beam 22. A pair of side load towers 36 and 38 are secured to the ground or stand holding the test material by any suitable means.

A pair of load cables 40 and 42 are connected from the load towers 36 and 38, respectively, to an arm or axle like member 44 which is connected to the wheel 12. Turn buckles 46 and 48 are provided to vary the tension on the cables 40 and 42. The purpose of the cables 40 and 42 is to maintain a predetermined position of the axle which acts as a reference point from which vibrations or forces are applied, as will be described.

A reaction load tower 50 is provided. A horizontal actuator 52 is connected at one end by a pivotable link 54 to the top of the reaction tower 50. The other end of the actuator 52 is connected to a pivotable link 56 which is secured to the end of the axle like member 44. A pair of vertical actuators 58 and 60 are connected between the base level or ground and the arm 44. One end of the actuator 58 is connected to a pivotable link 62 which forms part of the connection means to the floor or ground. The other end of the actuator 58 is connected to a pivotable link 64 which forms part of the connecting mechanism 66 which is connected to the arm 44.

In like manner, one end of the vertical actuator 60 is connected to a pivotable link 68 which forms part of the connection means to the base of the testing machine. The other end of the actuator 60 is connected to a pivotable link 70 which forms part of the connecting mechanism 72 which is secured to the arm 44.

Referring to FIG. 3, details of a typical wheel and hub assembly are illustrated. As illustrated, the tire 16 contacts the frame 14 and is held in the main structure of the wheel 12. The wheel is bolted to a hub 74 and a spindle 76. Suitable wheel bearings 78 are provided in the hub. A spindle adaptor plate 80 includes various mechanisms to connect the wheel 12 to the arm 44.

A slip ring adaptor mechanism 82 is connected to the wheel mechanism and includes slip rings to take off electrical connections to measure the various reactions of the rotational components under test. The test may involve the testing of the wheel or a hub associated with the wheel.

During a testing operation, the mechanical actuators 52, 58 and 60 are programmed by electrical signals. These signals may be produced by recorded signals developed as a result of actual testing of vehicles in the field. Consequently, the electrical signals derived from the recorded signals and applied to vibrate or drive the mechanical actuators actually simulate the road conditions for testing the wheels and the hubs within the wheels.

Means for programming mechanical actuators by the use of recorded signals on tapes which are converted to electrical control signals are well known to those skilled in the field and therefore not shown or described in detail.

Because the wheel 12 and hub 74 do not need to be rotated, the mechanism for performing the testing is greatly simplified. Although the wheel mechanism is rotated at a rate of about 5 rotations per minute during the testing, this rotation is merely to prevent excessive wear on the tires at one place and to assure testing of the wheel and hub at different positions.

Because the wheel mechanism does not have to be rotated, the various bearings and other mechanical parts associated with the rotating parts are not subjected to excessive loads, wear, heat and other environmental effects of rotation. Also, this rotation does not, as discovered, add to the overall fatigue stresses developed in the wheel and associated parts.

The number and locations of the mechanical actuators are dependent upon the parts under test and the degree of accuracy desired. In a typical testing system, two spaced vertical actuators and one lateral actuator were found to be adequate.

Means for steering the wheel slightly during the testing may be provided to assure that the wheel and hub are positioned in different positions as they would be in normal use. A king pin arrangement 84 may include a handle to permit manual steering of the wheel.

What is claimed is:

1. Apparatus for testing a component which is normally rotated during operation comprising:
   (a) a fixture for receiving said component to be tested and maintaining it relatively free from rotation during said testing;
   (b) first actuator means to apply programmed lateral dynamic forces and moments to said component under test;
   (c) second actuator means to apply programmed vertical dynamic forces and moments to said component under test;
   whereby said component under test is tested without rotating said component by simulated forces representative of dynamic forces encountered under actual dynamic road conditions.

2. Apparatus as set forth in claim 1 wherein said component under test comprises a wheel including a tire fixed into a frame of said fixture, and an arm member is connected to said wheel, with said first and second actuator means being connected to said arm member.

3. Apparatus as set forth in claim 1 wherein said component under test comprises a hub connected to said wheel.

4. Apparatus as set forth in claim 2 wherein said first actuator means comprises two or more vertically disposed spaced actuators connected around said arm member between said arm member and a base and said second actuator means comprises an additional actuator connected between the end of said arm member and a reaction load tower.

5. Apparatus as set forth in claim 4 wherein said two or more actuators and said additional actuator all include two ends having pivotable link means connected thereto.

6. Apparatus for testing a hub which is normally rotated during operation comprising:
   (a) a fixture for receiving said hub to be tested and maintaining it relatively fixed;
   (b) an arm member connected to said hub;
   (c) first actuator means connected to said arm member to apply programmed lateral forces and moments to said hub under test;
   (d) second actuator means connected to said arm member to apply programmed vertical forces and moments to said hub under test;
   (e) side load towers;
   (f) horizontal means including cables connecting said arm member to side load towers to maintain a predetermined position of said arm member which provides a reference location from which vertical forces are applied;
   whereby said hub under test is tested by forces representative of forces encountered under actual road conditions without rotating said hub.

7. Apparatus as set forth in claim 6 wherein turnbuckles are provided on said cable to vary the tension thereof.

8. A method of testing a component which is normally rotated during operation comprising the steps of:
   (a) providing a fixture to receive said component to be tested and to maintain it relatively free of rotation during a test;
   (b) applying programmed lateral dynamic forces to said component under test; and
   (c) applying programmed vertical dynamic forces to said component under test;
   whereby said component under test is tested without rotating said component by simulated forces representative of dynamic forces encountered under actual dynamic road conditions.

9. A method as set forth in claim 8 wherein the additional step is provided of measuring the reactions of said component under test while said lateral and vertical forces are applied thereto.

10. A method as set forth in claim 9 wherein the additional steps are provided of rotating said component at a relatively slow speed and selectively steering said component while said component is being tested.

* * * * *